United States Patent
Herter et al.

(10) Patent No.: US 8,352,140 B2
(45) Date of Patent: Jan. 8, 2013

(54) METHOD AND DEVICE FOR DETERMINING AND DAMPENING JUDDERING VIBRATIONS OF A DRIVETRAIN

(75) Inventors: Peter Herter, Ravensburg (DE); Joachim Staudinger, Ravensburg (DE); Rainer Petzold, Friedrichshafen (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 445 days.

(21) Appl. No.: 12/667,419

(22) PCT Filed: Jun. 19, 2008

(86) PCT No.: PCT/EP2008/057754
§ 371 (c)(1),
(2), (4) Date: Dec. 31, 2009

(87) PCT Pub. No.: WO2009/007219
PCT Pub. Date: Jan. 15, 2009

(65) Prior Publication Data
US 2010/0185373 A1  Jul. 22, 2010

(30) Foreign Application Priority Data
Jul. 11, 2007  (DE) .......................... 10 2007 032 206

(51) Int. Cl.
*G06F 19/00* (2006.01)
(52) U.S. Cl. .......................................... 701/67; 701/68
(58) Field of Classification Search .................. 477/77, 477/83; 701/51, 60, 64, 67, 68
See application file for complete search history.

(56) References Cited

U.S. PATENT DOCUMENTS

| | | | |
|---|---|---|---|
| 5,439,425 | A | 8/1995 | Ramm et al. |
| 6,024,674 | A | 2/2000 | Sato et al. |
| 6,102,144 | A | 8/2000 | Lutz |
| 6,314,342 | B1 | 11/2001 | Kramer et al. |
| 6,656,088 | B2 * | 12/2003 | Nealey .................. 477/110 |
| 7,396,314 | B2 * | 7/2008 | Winkel et al. .................. 477/77 |
| 2004/0186645 | A1 | 9/2004 | Kohno et al. |
| 2004/0260444 | A1 | 12/2004 | Winkelmann et al. |

FOREIGN PATENT DOCUMENTS

| | | |
|---|---|---|
| DE | 36 24 755 A1 | 1/1988 |
| DE | 197 21 298 A1 | 11/1998 |
| DE | 697 13 254 T2 | 9/2002 |
| DE | 10 2007 006 803 A1 | 9/2007 |
| EP | 0 845 616 A2 | 6/1998 |
| EP | 1 539 526 B1 | 11/2006 |
| GB | 2 197 049 A | 5/1988 |

* cited by examiner

*Primary Examiner* — Richard M. Camby
(74) *Attorney, Agent, or Firm* — Davis & Bujold, PLLC

(57) ABSTRACT

A method of determining and reducing vibrations caused by a clutch (3) in a drivetrain (1) of a motor vehicle, in which the disturbing vibrations are detected by a control and regulating unit aided by suitable sensors and, if predetermined limit values are exceeded, at least one device is actuated by the control and regulating unit in such manner that the disturbing vibrations are completely eliminated or at least reduced in amplitude. At least one torque sensor (8, 9, 10) is used to detect the occurrence of vibrations in the drivetrain (1) and the torque sensor (8, 9, 10) is used to determine vibration amplitude.

9 Claims, 1 Drawing Sheet

METHOD AND DEVICE FOR DETERMINING AND DAMPENING JUDDERING VIBRATIONS OF A DRIVETRAIN

This application is a National Stage completion of PCT/EP2008/057754 filed Jun. 19, 2008, which claims priority from German patent application Ser. No. 10 2007 032 206.4 filed Jul. 11, 2007.

FIELD OF THE INVENTION

In motor vehicles, during the slipping phase of a clutch in the drivetrain, the clutch can produce vibrations. These vibrations are generated when, with a slipping clutch, periodic torques are produced which are in the resonance frequency range of the drivetrain dynamically separated by the clutch.

BACKGROUND OF THE INVENTION

These vibrations, which are also referred to as juddering of the clutch, can be excited spontaneously or in a forced manner. Spontaneous clutch juddering is caused by a reduction in the frictional coefficient of the clutch lining in relation to the sliding speed, and may be of considerable severity depending on the overall damping of the drivetrain.

In contrast, forced clutch juddering is excited by sources that are external in relation to the friction partners, which may for example include axial vibrations of the crankshaft or deviations from parallelism at the clutch pressure plate in combination with an angular offset between the clutch pressure plate and the clutch disk that carries the friction lining.

The rotary vibrations in the drivetrain produced by clutch juddering are converted by the driven wheels into longitudinal vibrations of the vehicle as a whole and are transmitted by the operating elements and via the vehicle seats to the occupants of the vehicle. Clutch juddering is therefore perceived by the occupants as unpleasant vibrations or oscillations, which can also be associated with noise.

Although high damping in the components of the drivetrain reduces the vibration amplitude during forced clutch juddering, in view of the general desire for the lowest possible fuel consumption by the motor vehicle this is often an unrealistic requirement because permanent high damping in the drivetrain can essentially be achieved only by the continual elimination of friction losses, for example in the transmission, the bearings and the seals.

From EP 845 616 A2 it is known, in the case of a starting clutch or a converter bridging clutch, to detect juddering of the clutch by measurement means with the aid of suitable sensors and a control and regulating device, and adopt active measures to end this juddering. The measures consist in modifying the ignition timing of an internal combustion engine connected to drive the clutch, so as in that way to influence the input torque of the clutch. Another measure is to increase the contact pressure of the clutch pressure plate against the clutch friction lining, but this makes it no longer possible to operate the clutch in a slipping mode, with the many advantages of so doing.

From EP 1 539 526 B1 it is known that with the help of rotational speed sensors the speeds of the clutch input side and the clutch output side can be detected in order to recognize the presence of juddering vibrations. In this case the torque is not known, but it must be known in order to counteract the judder by a drivetrain excitation of opposite phase. Thus, an adaptation algorithm is used to modify the amplitude of the oppositely-phased torque excitation until the vibrations are damped. The disadvantage of this is that to determine the oppositely-phased vibration amplitude the adaptation algorithm requires a certain recognition time. For this, the torque fluctuations have to be continually determined by the adaptation algorithm since the conditions (speed, torque, temperature, etc.) in the drivetrain can vary continually so that the fluctuation amplitude does not remain constant. Owing to the time required for amplitude recognition, damping or elimination are insufficient.

SUMMARY OF THE INVENTION

Since the known measures give less than satisfactory results regarding the reduction or elimination of clutch juddering, the purpose of the present invention is to propose a method and a device with which the disturbing rotational fluctuations of a drivetrain can be determined and damped more quickly and more effectively.

This objective is achieved by virtue of the characteristics specified in the claims relating to method and to device, while advantageous further developments and design features of the invention emerges from the subordinate claims.

Accordingly, in relation to the method it is provided that with the help of suitable sensors a control and regulating unit recognizes and evaluates the disturbing vibrations. If predetermined limit values are exceeded, the control and regulating unit acts upon at least one device in such manner that by its actuation the disturbing vibration in the drivetrain and/or in the vehicle as a whole is completely eliminated or at least its amplitude is damped. According to the invention, at least one torque sensor is used to determine the occurrence of torque fluctuations and their amplitude in the drivetrain. The amplitude of the torque fluctuations is transmitted to the clutch, so that the slow adaptation algorithm and the associated recognition time are not needed. Thus, an occurrence of rotational fluctuations in the drivetrain during a starting or maneuvering phase can be damped immediately. A further advantage of the method according to the invention is that the signal of the torque sensor leads the signal of the speed sensor by 90 degrees, which is advantageous for a regulation process.

Moreover, the clutch position is determined as a function of the torque fluctuations of the drivetrain detected by the torque sensor, in order to dampen or eliminate the vibrations. When the torque that can be transmitted by the clutch changes during the slipping phase, this variation will have an influence on the vibrations. A deliberate variation of the transmissible torque damps the drivetrain vibrations and in the ideal case eliminates them completely.

A device for reducing the drivetrain vibrations caused by the clutch comprises at least one torque sensor in the drivetrain. Advantageously, the sensor is positioned directly after the clutch, where the clutch torque is determined immediately. Alternatively, the sensor can be positioned after the transmission or on one of the wheel shafts, in which case the vibration amplitudes at the measurement position is converted in order to determine the vibration amplitude at the clutch. Advantageously, a torque sensor already present in the drivetrain can be used to determine the torque fluctuations.

BRIEF DESCRIPTION OF THE DRAWING

Other advantages and advantageous features of the invention emerge from the claims and from the example embodiment whose principle is described with reference to the drawing, which shows:

DETAILED DESCRIPTION OF THE PREFERRED EMBODIMENTS

Figure 1:
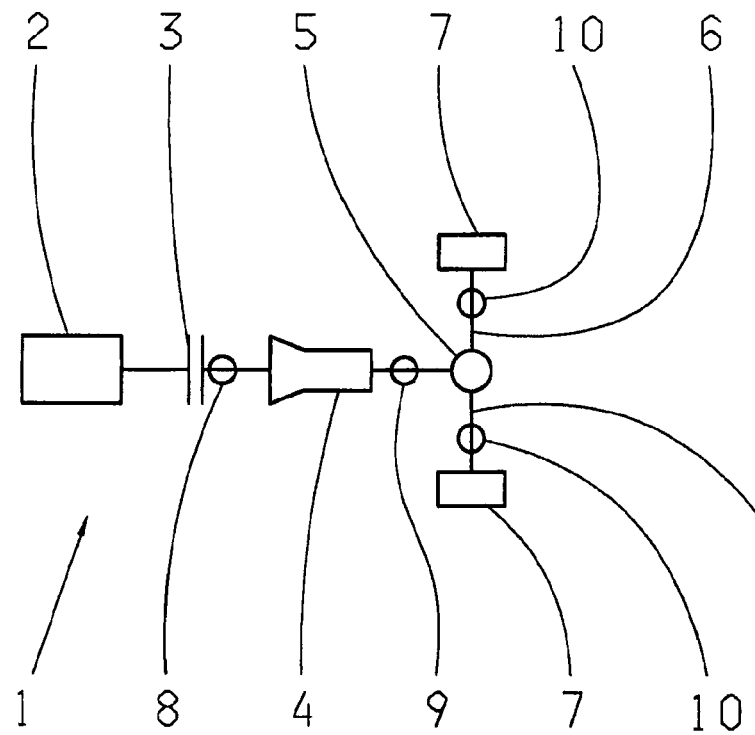
FIG. 1: Greatly simplified diagram of a drivetrain.

FIG. 1 shows a greatly simplified, diagrammatic representation of a drivetrain 1 comprising an internal combustion engine 2, a clutch 3 and a transmission 4, a differential 5, two wheels shafts 6 and two wheels 7. In addition three possible positions 8, 9, 10 are shown, which are suitable for fitting a torque sensor for detecting the occurrence of torque fluctuations and their amplitudes in the drivetrain 1. In position 8, the torque fluctuations and their amplitude are determined directly at the clutch 3 and transmitted to a clutch control unit (not shown). This enables the clutch position to be adjusted in such manner that the vibrations are damped or eliminated. Torque fluctuation in the drivetrain 1 determined at positions 9 or 10 is first converted by the clutch control unit in order to establish the vibration amplitude at the clutch 3 itself. Since the transmission ratios of the axle transmission 5 and the main transmission 4 are known, the vibration amplitude at the clutch 3 can be calculated easily.

Figure 2:
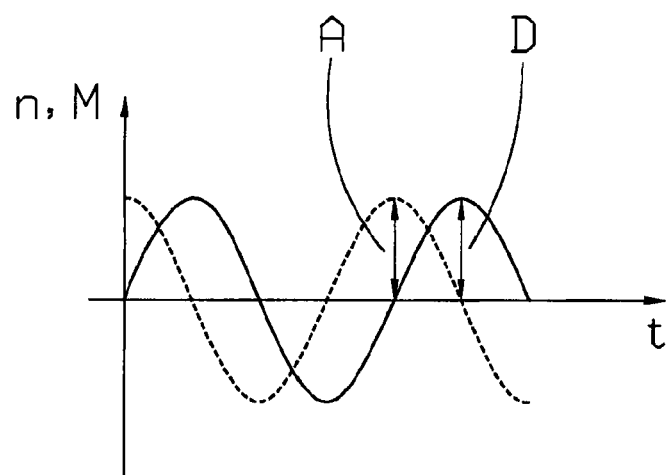
FIG. 2: The torque and rotation speed fluctuations.

FIG. 2 shows a diagram with a signal 11 of a torque fluctuation and a signal 12 of a speed fluctuation. It can be seen clearly that the torque fluctuation signal 11 leads the speed fluctuation signal 12 by 90 degrees, so the torque amplitude A can be measured earlier than the speed amplitude D.

INDEXES

1 Drivetrain
2 Internal combustion engine
3 Clutch
4 Transmission
5 Differential
6 Wheel shaft
7 Wheel
8 First position of the torque sensor
9 Second position of the torque sensor
10 Third position of the torque sensor
11 Torque signal
12 Rotational speed signal
n Rotational speed
M Torque
t Time
A Torque amplitude
S Speed amplitude

The invention claimed is:

1. A method of determining and reducing vibrations caused by a clutch (3) in a drivetrain (1) of a motor vehicle, in which disturbing vibrations are detected by a control and regulating unit aided by suitable sensors, and if predetermined limit values are exceeded, the control and regulating unit actuates at least one device in such manner that the disturbing vibrations are one of at least reduced in amplitude and completely eliminated, and the method comprising the steps of:
 detecting the vibrations in the drivetrain (1) with a single torque sensor (8) located at the clutch,
 determining a vibration amplitude directly at the clutch via the torque sensor (8),
 transmitting the vibration amplitude to the control and regulating unit, and
 actuating the device with the control and regulating unit based on the vibration amplitude to at least reduce the vibration amplitude of the vibrations.

2. The method according to claim 1, further comprising the step of determining a position of the clutch as a function of torque fluctuations of the drivetrain (1), acting upon the torque fluctuations with the clutch to dampen the torque fluctuations.

3. The method according to claim 1, further comprising the step of determining torque fluctuations with the torque sensor at the clutch already in the drivetrain (1).

4. A device for determining and reducing vibrations caused by a clutch (3) in a drivetrain (1) of a motor vehicle, the clutch being arranged in the drivetrain (1), and
 a control and regulating unit detecting disturbing vibrations aided by a single torque sensor (8) located at the clutch for determining the disturbing vibrations,
 wherein the torque sensor (8, 9, 10) is positioned one of either directly after the clutch (3), directly after a transmission (4) and on a wheel shaft (6) of the vehicle, the torque sensor transmitting torque fluctuations to the control and regulating unit, and the control and regulating unit converting the torque fluctuations to establish vibration amplitudes.

5. A method for determining and reducing vibrations caused by a clutch (3) in a drivetrain (1) of a motor vehicle, the method comprising the steps of:
 predetermining clutch torque fluctuation limit values;
 monitoring clutch torque fluctuations with a single sensor;
 transmitting the clutch torque fluctuations to a clutch control unit;
 determining a vibration amplitude of the clutch torque fluctuations; and
 adjusting engagement of the clutch, via the clutch control unit, to at least reduce drivetrain torque fluctuation.

6. The method according to claim 5, further comprising the steps of locating the single sensor at the clutch, determining the vibration amplitude of the clutch torque fluctuations directly at the clutch and transmitting the vibration amplitude to the clutch control unit.

7. The method according to claim 5, further comprising the steps of locating the single sensor between a transmission and a differential, calculating the vibration amplitude from the clutch torque fluctuations and a transmission ratio of the transmission and transmitting the vibration amplitude to the clutch control unit.

8. The method according to claim 5, further comprising the steps of locating the single sensor on a wheel shaft between a differential and a wheel, calculating the vibration amplitude from the clutch torque fluctuations and a transmission ratio of the differential and transmitting the vibration amplitude to the clutch control unit.

9. The method according to claim 6, further comprising the steps determining a clutch position as a function of the clutch torque fluctuations of the drivetrain detected by the torque sensor at the clutch, and varying torque that is transmittable by the clutch during a slipping phase of the clutch.

* * * * *